United States Patent
Umbelina

(10) Patent No.: US 11,709,002 B1
(45) Date of Patent: Jul. 25, 2023

(54) SOLAR GRILL AND OVEN

(71) Applicant: Maria Umbelina, London (CA)

(72) Inventor: Maria Umbelina, London (CA)

(*) Notice: Subject to any disclaimer, the term of this patent is extended or adjusted under 35 U.S.C. 154(b) by 72 days.

(21) Appl. No.: 17/537,653

(22) Filed: Nov. 30, 2021

(51) Int. Cl.
*F24S 20/30* (2018.01)
*A21B 1/52* (2006.01)
*A47J 37/07* (2006.01)

(52) U.S. Cl.
CPC ............... *F24S 20/30* (2018.05); *A21B 1/52* (2013.01); *A47J 37/07* (2013.01)

(58) Field of Classification Search
CPC .............. A47J 37/07; F24S 20/30; A21B 1/52
USPC ................................................. 126/681, 682
See application file for complete search history.

(56) References Cited

U.S. PATENT DOCUMENTS

| | | | | |
|---|---|---|---|---|
| 2,859,745 A * | 11/1958 | Von Brudersdorff | ... | F24S 23/70 126/681 |
| 3,025,851 A * | 3/1962 | Steinberg | ................ | F24S 20/30 99/425 |
| 3,106,201 A * | 10/1963 | Steinberg | ................ | F24S 50/20 99/425 |
| 3,163,892 A * | 1/1965 | Hager, Jr. | ................ | F24S 50/80 165/96 |
| 3,236,227 A * | 2/1966 | Steinberg | ................ | F24S 20/30 126/682 |
| 3,301,171 A * | 1/1967 | Steinberg | ................ | F24S 20/30 99/425 |
| 3,391,688 A * | 7/1968 | Dery | ....................... | F24S 20/30 99/425 |
| 3,938,497 A * | 2/1976 | Andrassy | ................ | F24S 20/30 126/400 |
| 4,077,391 A * | 3/1978 | Way, Jr. | ................... | F24S 23/77 126/684 |
| 4,082,079 A * | 4/1978 | Rodgers | ................... | F24S 20/30 126/681 |
| 4,083,357 A * | 4/1978 | Fischer | .................... | F24S 20/30 126/696 |
| 4,090,497 A * | 5/1978 | Kelly | ...................... | F24S 70/65 126/633 |
| 4,203,427 A * | 5/1980 | Way, Jr. | ................... | F24S 50/20 165/137 |
| 4,220,133 A * | 9/1980 | Way, Jr. | .............. | A47J 37/0704 126/41 E |
| 4,220,139 A * | 9/1980 | Ramsden | ................ | F24S 50/80 126/649 |

(Continued)

*Primary Examiner* — Avinash A Savani
*Assistant Examiner* — Deepak A Deean
(74) *Attorney, Agent, or Firm* — Sandy Lipkin

(57) ABSTRACT

A solar barbeque and solar oven combination that provides for solar cooking, grill-style or oven-style, outdoors. The grill portion sits on top and has a glass cooking surface. Beneath the cooking surface are a series of louvers that can be open and closed to control temperature. A volume of space below the louvers has mirrored surfaces for the collection of solar energy. A side table is foldable and attached to the grill portion for additional mirrored surfaces and grilling surface area. Below the grill is a solar oven being enclosed on three sides and having doors in the front made of glass that are openable with wooden handles. Inside of the solar oven are mirrored surfaces and a grill/ surface for cooking. On the bottom of the interior of the oven is a heat capturing and/or storing device such as a heating stone or metal heat battery. The entire apparatus includes support legs with wheels and a handle for easy transport.

14 Claims, 4 Drawing Sheets

(56) References Cited

U.S. PATENT DOCUMENTS

| | | | | | |
|---|---|---|---|---|---|
| 4,236,508 | A | * | 12/1980 | Kerr | F24S 20/30 126/682 |
| 4,446,854 | A | * | 5/1984 | Clevett | F24S 20/30 126/684 |
| 4,848,320 | A | * | 7/1989 | Burns | F24S 30/425 126/682 |
| 5,113,845 | A | * | 5/1992 | Nix | F24S 23/77 126/696 |
| 5,139,010 | A | * | 8/1992 | Borgens, Jr. | F24S 20/30 126/684 |
| 5,524,610 | A | * | 6/1996 | Clark | F24S 23/70 126/41 R |
| 8,151,787 | B1 | * | 4/2012 | Sivert | F24S 30/452 126/681 |
| 8,490,614 | B1 | * | 7/2013 | Gregory | A47J 37/0754 126/41 R |
| 9,822,992 | B2 | * | 11/2017 | Thomas | F24S 20/30 |
| 11,162,713 | B2 | * | 11/2021 | Garvey | F24S 90/00 |
| 2005/0045174 | A1 | * | 3/2005 | Ghausi | F24S 20/30 126/682 |
| 2008/0041365 | A1 | * | 2/2008 | Weggel | F24S 23/81 126/681 |
| 2009/0114210 | A1 | * | 5/2009 | Guice | F24S 30/425 126/569 |
| 2011/0023868 | A1 | * | 2/2011 | Seller | F24S 20/30 126/681 |
| 2013/0022727 | A1 | | 1/2013 | Sherwin | |
| 2014/0251314 | A1 | * | 9/2014 | Hoffmann | F24S 30/452 126/714 |
| 2014/0345601 | A1 | * | 11/2014 | Thomas | F24S 20/30 126/681 |
| 2017/0196400 | A1 | * | 7/2017 | Colston | A47J 37/0704 |

* cited by examiner

SOLAR GRILL AND OVEN

BACKGROUND OF THE INVENTION

Field of the Invention

The field of this invention relates generally to the field of solar cooking devices and more particularly toward a solar powered barbeque grill with a built-in solar oven.

Description of the Prior Art

A barbeque grill is a device that cooks food by applying heat from below. There are several varieties of grills, with most falling into one of two categories: gas-fueled or charcoal-fueled. Gas-fueled grills typically use propane or butane or natural gas as their fuel source, with the gas flame either cooking food directly or heating grilling elements which in turn radiate the heat necessary to cook food. Gas grills are available in sizes ranging from small, single steak grills up to large, industrial sized restaurant grills which are able to cook enough meat to feed a hundred or more people. Some gas grills can be switched between using liquified petroleum gas and natural gas fuel, although this requires physically changing key components, including burners and regulator valves. Charcoal grills use either charcoal briquettes or natural lump charcoal as their fuel source. When burned, the charcoal will transform into embers radiating the heat necessary to cook food.

Various attempts have been made to solve problems found in solar cooking devices. Among these are found in U.S. Pat. Nos. 9,822,992, 4,082,079 and U.S. Pat. App. Pub. Nos. 20110023868, 20080041365 and 20130022727. This cited art represents the current state of the art. None of the cited prior art, taken either singly or in combination, is seen to describe the instant invention as described and claimed herein. Thus, a need exists for a reliable solar grill and oven, which is a solar powered barbeque grill with a built-in solar oven.

SUMMARY OF THE INVENTION

The basic embodiment of the present invention teaches a combination solar cooking device comprising: a grill, said grill further comprising: a top; a bottom; a perimeter wall between said top and said bottom wherein an interior space is defined between said top, said bottom and said perimeter wherein said interior space has mirrored surfaces; a transparent surface on said top; a series of movable louvers below said transparent surface; a temperature reading device on an exterior of said perimeter wall; and a knob to control the position of said movable louvers to control the amount of sunlight entering through said movable louvers and to thereby control the temperature of said transparent surface; an oven, said oven further comprising: a perimeter wall substantially in line with said perimeter wall of said grill; an openable door on said perimeter wall of said oven, said openable door having a transparent face; a bottom; an interior portion defined by said perimeter wall of said oven and said bottom, said interior portion having a top adjacent said bottom of said grill, an interior sidewall opposing said perimeter of said oven and connected to said bottom, said interior portion having mirrored surfaces; and a shelf inside of said interior portion for the placement of food thereon to be cooked.

The above embodiment can be further modified by defining that said transparent surface of said grill portion is made of glass.

The above embodiment can be further modified by defining that said transparent face of said solar oven portion is made of glass.

The above embodiment can be further modified by defining that said openable door of said solar oven portion has attached thereto a handle made of wood.

The above embodiment can be further modified by defining that said bottom of said solar oven portion holds a heat sink.

The above embodiment can be further modified by defining that said heat sink is a heavy stone.

The above embodiment can be further modified by defining that said heat sink is a metal heat battery.

The above embodiment can be further modified by defining that support legs are attached to said solar oven portion.

The above embodiment can be further modified by defining that wheels are attached to said solar oven portion.

The above embodiment can be further modified by defining that a handle is attached to said solar grill portion.

The above embodiment can be further modified by defining that a side table is attached adjacent said solar grill portion, said side table further comprising: a bottom; a perimeter around said bottom; one or more mirrored panels hingedly attached to said perimeter.

The above embodiment can be further modified by defining that a grilling surface is revealed when said hingedly attached mirrored panels are folded open.

The above embodiment can be further modified by defining that a plurality of movable louvers is located below said grilling surface.

The above embodiment can be further modified by defining that a support bar is attached to a side of said solar oven portion and connects to said bottom of said side table such that said side panel can be stored in a position flush with said side of said solar oven when not in use.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
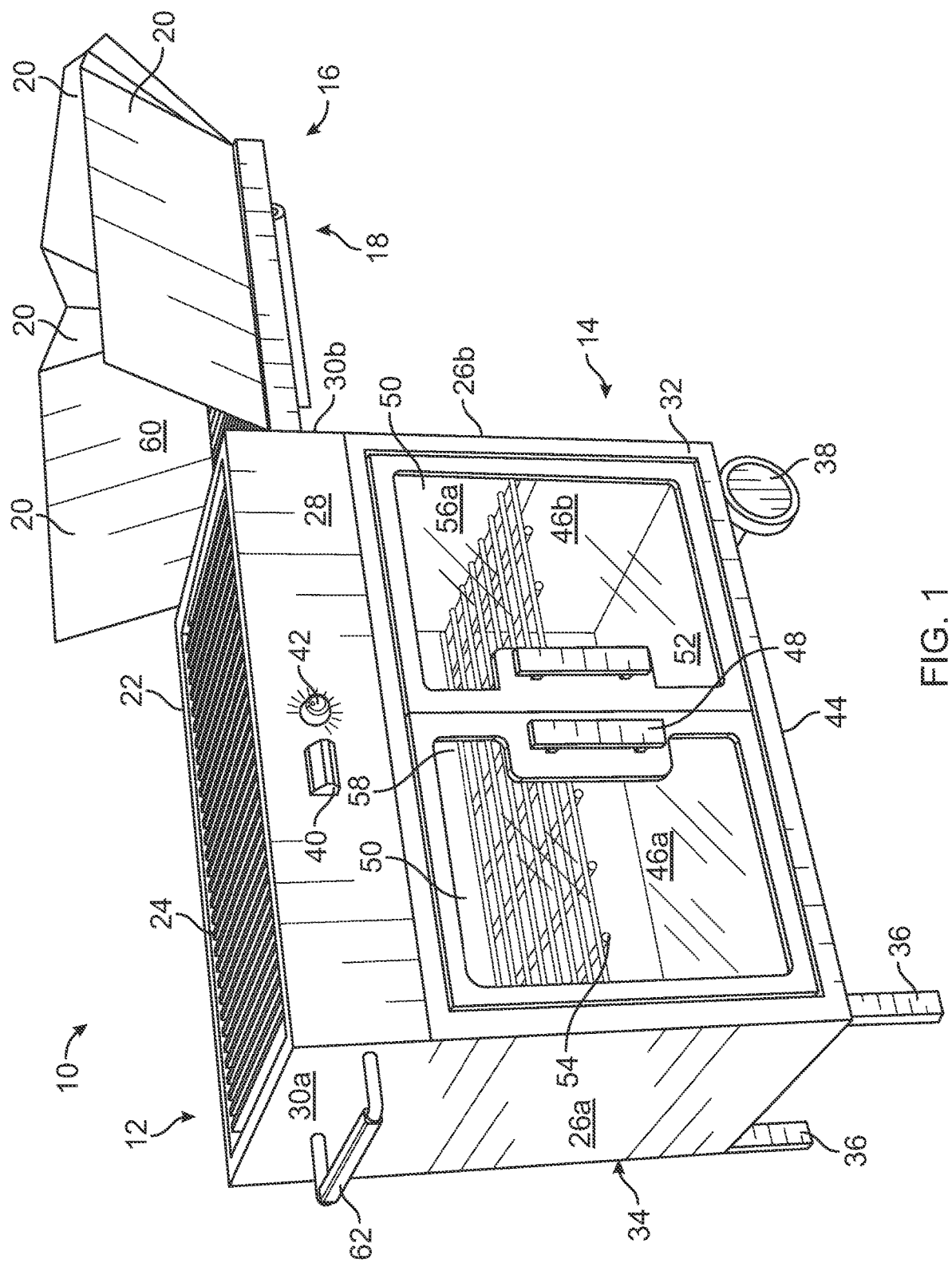
FIG. 1 is a front perspective view of the solar barbeque with solar oven of the instant invention.

Turning to the drawings, the preferred embodiment is illustrated and described by reference characters that denote similar elements throughout the several views of the instant invention.

The preferred embodiment of the instant invention provides for an apparatus that can be used outdoors that harnesses the power of the sun to cook food. The apparatus is a combination solar barbeque grill and solar oven. This invention is superior to gas-powered grills because gas can alter the flavor of food. This invention is superior to charcoal powered grills because charcoal burns itself out and leaves a mess that needs to be cleaned up afterward. With solar energy, one need not worry about running out of gas or charcoal. Furthermore, there is often a need to use an oven, but most people do not like to use ovens during the hot summer months because it adds heat to the home. The combination of a solar powered barbeque with a solar oven provides more options and flexibility regarding what to cook outside, particularly during hot summer months, using the heat of the sun.

Figure 2:
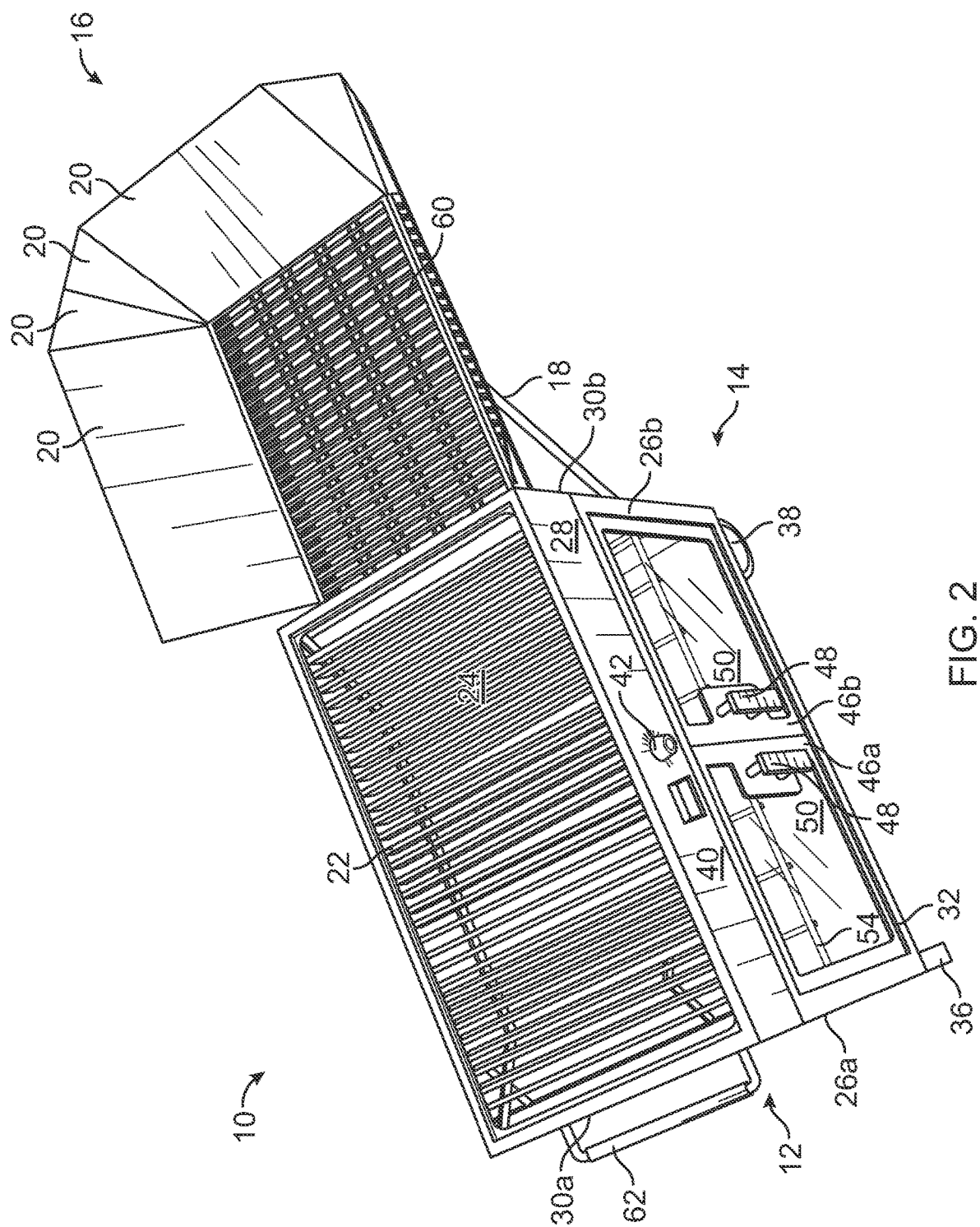
FIG. 2 is a top view of the solar barbeque with solar oven of the instant invention.
Figure 3:
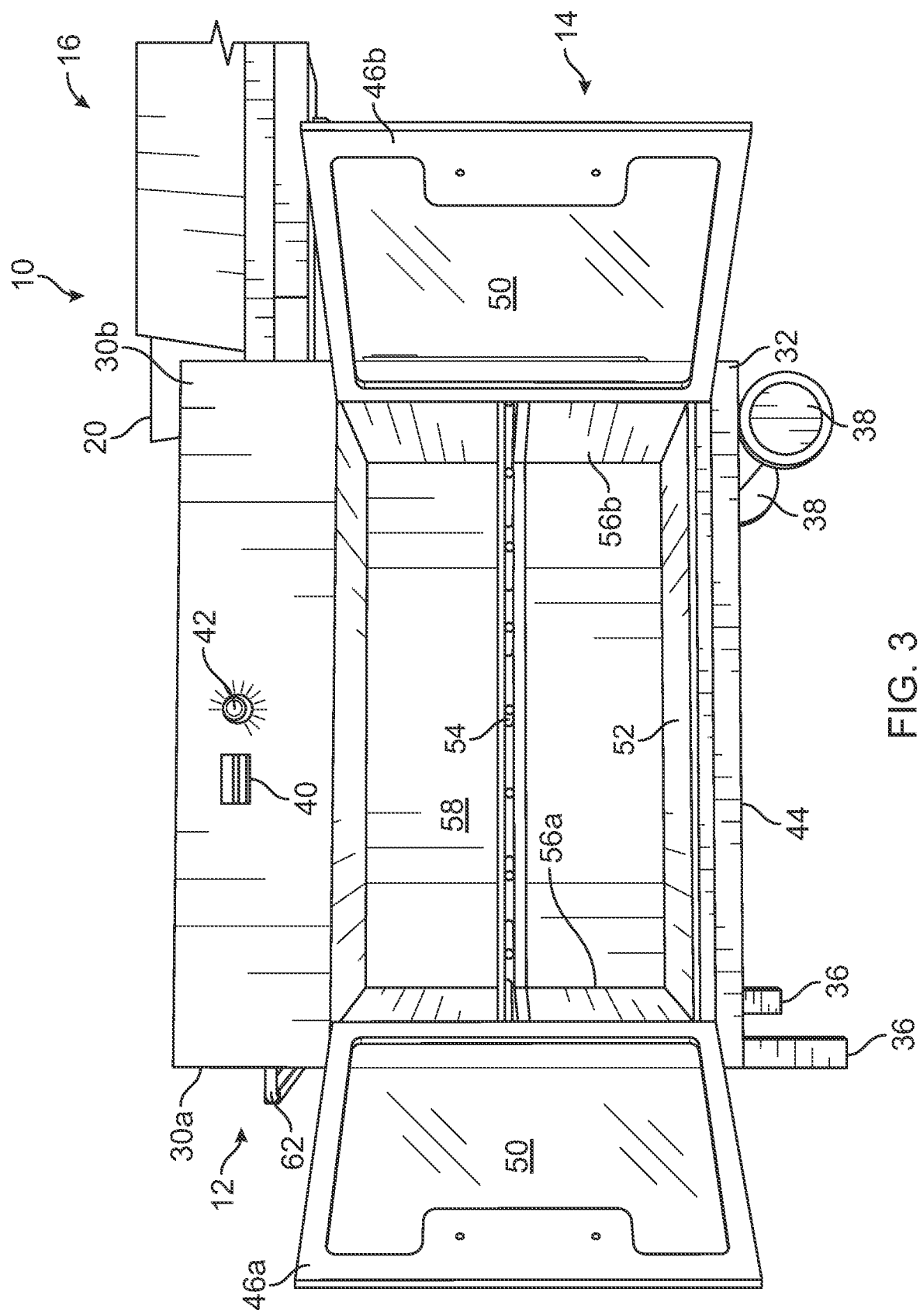
FIG. 3 is a front view of the solar barbeque with solar oven of the instant invention with the oven doors open.
Figure 4:
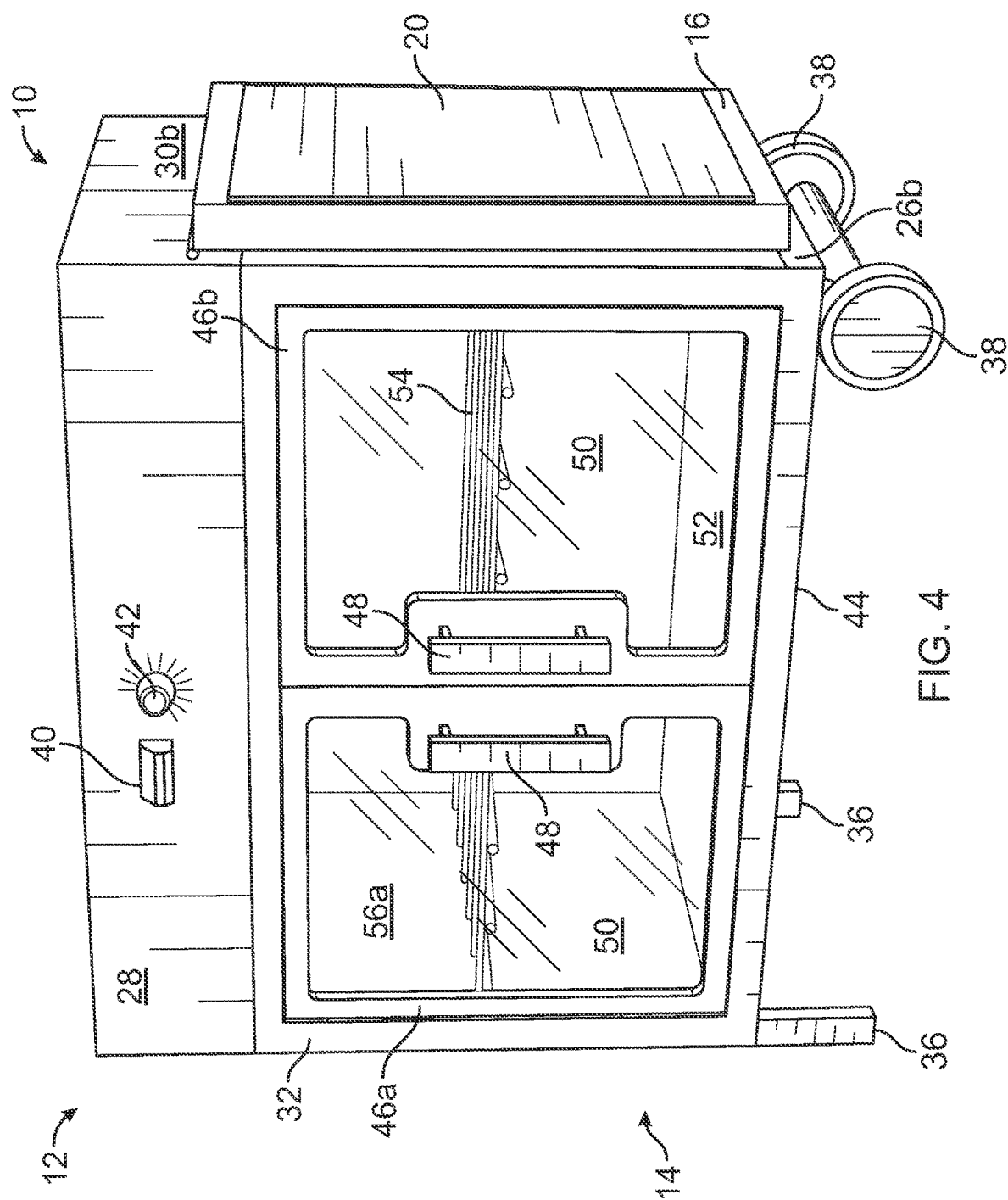
FIG. 4 is a front perspective view of the solar barbeque with solar oven in its compact storage and transport position.

FIGS. 1-4 shows various views and orientations of the features of the instant invention. The device 10 is a combination that includes a solar barbeque 12 on the top with a solar oven 14 below it. Adjacent the barbeque portion 12 is a side table 16 with a support arm 18. The support arm 18 allows the side table 16 to be deployed in use, but folded down for storage when not in use. Foldable mirrored panels 20 are hingedly attached to the side table 16. When unfolded at their hinges, the mirrored panels 20 can collect energy from the sun while simultaneously exposing another surface for grilling. This surface includes louvers 60 that are covered by a glass top. This mirrors the construction of the barbeque portion 12 which includes louvers 22 and a glass top 24 above the louvers 22 for grilling. The grill as illustrated is substantially rectangular in shape, but is not limited to this shape. As illustrated, the barbeque portion 12 has a back, a front 28 and two sides 30a, 30b. On the front 28 is found a thermometer 40 and a control knob 42 which adjusts the louvers 22 to reach the desired temperature.

The barbeque portion 12 has volume underneath the louvers 22 that include more reflective surfaces for the collection of solar energy. These surfaces are found on the sides and the bottom of the volume below the louvers.

The oven portion 14 is situated below the barbeque portion 12 and has a front 32, two sides 26a, 26b, a back 34 and a bottom 44. The front 32 of the oven portion 14 includes one or more doors 46a, 46b, each with a wooden handle 48 for easy opening without excess heat for the hands of the opener. The doors 46a, 46b have glass panes 50 substantially covering the doors 46a, 46b. Inside of the oven is an interior that includes a top, two sides 56a, 56b and a rear wall 58. The two sides 56a, 56b and the rear wall 58 are mirrored as well for more surfaces to collect solar energy. On the bottom of the interior of the oven portion 14 is a hearing or a metal heat battery to collect heat or to electricity from the sun and store it for later use. Substantially in the center of the interior of the oven portion 14 is a rack/shelf 34 for cooking.

The entire device 10 is supported by one or more support legs 36 and can include one or more wheels 38 on a side 26a, 26b of the oven opposite the support legs 36. A handle 62 is placed on one of the sides 30a, 30b of the grill, opposite the side that has the wheels for easy transport of the entire device 10.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A combination solar cooking device comprising:
   a solar grill, said grill further comprising:
      a top;
      a bottom;
      a perimeter wall between said top and said bottom wherein an interior space is defined between said top, said bottom and said perimeter wherein said interior space has mirrored surfaces;
      a transparent grilling surface on said top configured to grill food thereon;
      a series of movable louvers below said transparent grilling surface;
      a temperature reading device on an exterior of said perimeter wall; and
      a knob to control the position of said movable louvers to control the amount of sunlight entering through said movable louvers and to thereby control the temperature of said transparent surface;
   a solar oven below said solar grill, said solar oven further comprising:
      a perimeter wall substantially in line with said perimeter wall of said grill;
      an openable door on said perimeter wall of said oven, said openable door having a transparent face;
      a bottom;
      an interior portion defined by said perimeter wall of said oven and said bottom, said interior portion having a top adjacent said bottom of said grill, an interior sidewall opposing said perimeter of said oven and connected to said bottom, said interior portion having mirrored surfaces, said interior portion configured to collect solar energy; and
      a shelf inside of said interior portion for the placement of food thereon to be cooked.

2. The combination solar cooking device as defined in claim 1 wherein said transparent grilling surface of said grill portion is made of glass.

3. The combination solar cooking device as defined in claim 1 wherein said transparent face of said solar oven portion is made of glass.

4. The combination solar cooking device as defined in claim 1 wherein said openable door of said solar oven portion has attached thereto a handle made of wood.

5. The combination solar cooking device as defined in claim 1 wherein said bottom of said solar oven portion holds a heat sink.

6. The combination solar cooking device as defined in claim 5 wherein said heat sink is a stone.

7. The combination solar cooking device as defined in claim 5 wherein said heat sink is a metal heat battery.

8. The combination solar cooking device as defined in claim 1 wherein support legs are attached to said solar oven portion.

9. The combination solar cooking device as defined in claim 1 wherein wheels are attached to said solar oven portion.

10. The combination solar cooking device as defined in claim 1 wherein a handle is attached to said solar grill portion.

11. The combination solar cooking device as defined in claim 1 wherein a side table is attached adjacent said solar grill portion, said side table further comprising:
   a bottom;
   a perimeter around said bottom;
   one or more mirrored panels hingedly attached to said perimeter.

12. The combination solar cooking device as defined in claim 11 wherein a grilling surface is revealed when said hingedly attached mirrored panels are folded open.

13. The combination solar cooking device as defined in claim 12 wherein a plurality of movable louvers is located below said transparent grilling surface.

14. The combination solar cooking device as defined in claim 11 wherein a support bar is attached to a side of said solar oven portion and connects to said bottom of said side table such that said side panel can be stored in a position flush with said side of said solar oven when not in use.

* * * * *